(12) United States Patent
Lange et al.

(10) Patent No.: US 10,967,593 B2
(45) Date of Patent: Apr. 6, 2021

(54) METHOD AND DEVICE FOR PRODUCING GREEN TIRES

(71) Applicant: Harburg-Freudenberger Maschinenbau GmbH, Hamburg (DE)

(72) Inventors: Thomas Lange, Hamburg (DE); Achim Behrens, Asendorf (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 734 days.

(21) Appl. No.: 14/769,613

(22) PCT Filed: Feb. 7, 2014

(86) PCT No.: PCT/DE2014/000054
§ 371 (c)(1),
(2) Date: Aug. 21, 2015

(87) PCT Pub. No.: WO2014/146632
PCT Pub. Date: Sep. 25, 2014

(65) Prior Publication Data
US 2016/0001514 A1    Jan. 7, 2016

(30) Foreign Application Priority Data
Feb. 22, 2013  (DE) .................. 10 2013 003 431.0

(51) Int. Cl.
*B29D 30/24* (2006.01)
*B29D 30/32* (2006.01)

(52) U.S. Cl.
CPC ............. *B29D 30/32* (2013.01); *B29D 30/24* (2013.01); *B29D 30/244* (2013.01); *B29D 2030/3207* (2013.01); *B29D 2030/3214* (2013.01)

(58) Field of Classification Search
CPC ...... B29D 30/24; B29D 30/32; B29D 30/244; B29D 30/245; B29D 30/246;
(Continued)

(56) References Cited

U.S. PATENT DOCUMENTS 3,853,653 A * 12/1974 Olbert ................... B29D 30/36
156/130.7
3,950,212 A * 4/1976 Bullmann .............. B29D 30/24
156/131
(Continued)

FOREIGN PATENT DOCUMENTS

DE         1159163 B      12/1963
DE         2827370 A1 *   1/1980
(Continued)

*Primary Examiner* — Geoffrey L Knable
(74) *Attorney, Agent, or Firm* — Lucas & Mercanti, LLP; Klaus P. Stoffel

(57) ABSTRACT

A method and a device for the production of a green tire, in which at least two materials in strip form are positioned on a tire building drum. At least two cores are set in place. The tire building drum is equipped both with a core clamping device and with a core fixing device. The tire building drum is composed of a central part and of two drum halves arranged adjacent to the central part on both sides. The drum halves are arranged such that they can be positioned in an axial direction. The central part is equipped with a variable diameter in a radial direction. A radial enlargement of the diameter of the central part is performed before the cores are set in place.

8 Claims, 14 Drawing Sheets

(58) Field of Classification Search
CPC ............ B29D 30/247; B29D 30/248; B29D 2030/2664; B29D 2030/3214; B29D 2030/3207
See application file for complete search history.

(56) References Cited

U.S. PATENT DOCUMENTS

| | | | | |
|---|---|---|---|---|
| 5,223,074 | A * | 6/1993 | Miyanaga | ............... B29D 30/32 156/398 |
| 7,431,787 | B2 * | 10/2008 | Bosio | ................... B29D 30/245 156/130.7 |
| 2003/0041975 | A1 * | 3/2003 | Evangelista | ......... B29D 30/248 156/394.1 |
| 2008/0264570 | A1 * | 10/2008 | Slots | ................... B29D 30/244 156/398 |

FOREIGN PATENT DOCUMENTS

| | | |
|---|---|---|
| DE | 102009025759 A1 | 11/2010 |
| EP | 0004715 A1 | 10/1979 |
| EP | 1537986 A1 | 6/2005 |
| FR | 1339492 A | 10/1963 |
| FR | 2228602 A1 | 12/1974 |
| GB | 1390399 A | 4/1975 |
| GE | 2140923 A1 | 3/1973 |
| JP | S59230736 A | 12/1984 |
| JP | 60-092837 A * | 5/1985 |
| JP | S6092837 A | 5/1985 |
| JP | 61-172724 A * | 8/1986 |
| WO | 2010064084 A1 | 6/2010 |

* cited by examiner

METHOD AND DEVICE FOR PRODUCING GREEN TIRES

The present application is a 371 of International application PCT/DE2014/000054, filed Feb. 7, 2014, which claims priority of DE 10 2013 003 431.0, filed Mar. 22, 2013, the priority of these applications is hereby claimed and these applications are incorporated herein by reference.

BACKGROUND OF THE INVENTION

The invention relates to a method for producing a green tire, in which method at least two materials in strip form are positioned on a tire building drum, and in which method at least two cores are set in place.

The invention also relates to a device for producing a green tire, in the case of which at least two materials in strip form can be positioned on a tire drum and in the case of which at least two cores can be positioned.

In the production of green tires, materials in strip form are positioned on a tire building drum. Filiform materials are commonly inlaid into the elastomer materials for reinforcement purposes. In lateral regions, in each case one core for reinforcement is set in place.

In the known prior art, the material that is used is laid onto a device which is composed of central and side parts. Cores that are used are positioned and clamped from the inside. The inner side of the cores is supported by a shoulder, and the core clamping remains active during the entire process. Owing to said permanent core clamping, ply fold-over is possible only in an upward direction.

A further disadvantage of the prior art consists in that a filament length between the cores is not clearly defined. It is furthermore not possible to work the material under the core.

Until now, the demands for accuracy in the positioning of the cores have not yet been satisfied in a fully satisfactory manner.

SUMMARY OF THE INVENTION

It is an object of the present invention to improve a method of the type mentioned in the introduction such that the positioning accuracy is increased.

Said object is achieved according to the invention in that the tire building drum is equipped both with a core clamping means and with a core fixing means.

It is a further object of the invention to design a device of the type mentioned in the introduction such that increased positioning accuracy is achieved.

Said object is achieved according to the invention in that the tire building drum is equipped both with a core clamping means and with a core fixing means.

According to the invention, it is provided in particular that the tire building drum is formed from a central part and from two drum halves arranged adjacent to the central part on both sides, that the drum halves can be positioned in an axial direction, that the central part is equipped with a variable diameter in a radial direction, and that a radial enlargement of the diameter of the central part is performed before the cores are set in place.

It is envisaged in particular that the two drum halves are movable independently of one another. The positioning can be performed using at least one servomotor.

Before the insertion of the cores, the central part is expanded in a radial direction, and the material in strip form is hereby tensioned on the tire building drum. Subsequently, the core setting means can press the cores against the side flanks of the expanded central part, and fix said cores there.

The method according to the invention makes it possible in particular to provide highly uniform filament lengths between the cores. This assists in achieving a rounded form of the tires and a uniform material distribution.

The capability of the drum halves to be positioned in a mutually independent manner makes it possible, in the case of single-stage build-up, to move between the side parts in the central part by means of pressure-exerting devices. The green tire can hereby be shaped in the side wall region without a changeover to another drum being necessary.

The method steps according to the invention and the device according to the invention will be discussed in more detail in the appended figures. In the abbreviations that are used, "IL" refers to inner liner, and thus the inner material strip, and "BP" refers to body ply, and thus the body material.

According to the invention, a fundamentally known two-stage process is implemented in a single-stage machine.

Through the combination of both a core clamping means and a core fixing means in the region of the tire building drum, considerably improved repeat accuracy is achieved in the tire production process.

The combination of the core clamping means and the core fixing means likewise makes it possible, in a single-stage process, to produce tires that are otherwise producible only in a two-stage process.

In particular, by means of the combination of features according to the invention, it is possible for any desired material to be folded into the cores in a single-stage process.

In the method according to the prior art, the problem has hitherto arisen that the cores are lost during the cambering process. In the method according to the invention, and using the device according to the invention, it is now the case that the cores are held in the carcass assembly, and are no longer lost.

Until now, a person skilled in the art has assumed that a two-stage or multi-stage tire production process is imperatively necessary. According to the invention, it has been identified that even a single-stage process implementation is possible. An essential concept according to the invention thus consists, even independently, in the realization of a single-stage tire production process.

It must also in particular be emphasized once again that an essential aspect according to the invention consists in that the cores are permanently fixed.

BRIEF DESCRIPTION OF THE DRAWING

Exemplary embodiments of the invention are schematically illustrated in the drawings, in which.

DETAILED DESCRIPTION OF THE INVENTION

Figure 1:
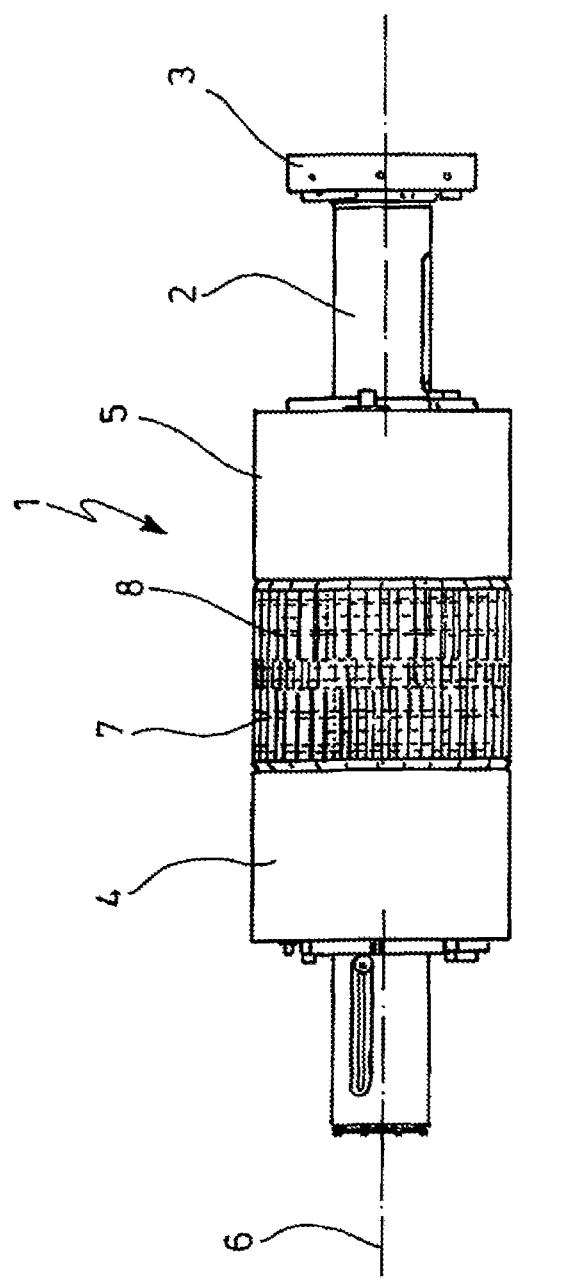
FIG. 1 shows a side view of a tire building drum which is equipped with a core clamping means and a core fixing means.

FIG. 1 shows a tire building drum (1) for use as a device for producing a green tire. The tire building drum (1) is fixed to a shaft (2). The shaft (2) is guided in rotatable fashion in the region of a bearing (3).

Two central parts (7, 8) are arranged between the drum halves (4, 5) in a longitudinal direction (6).

Figure 2:
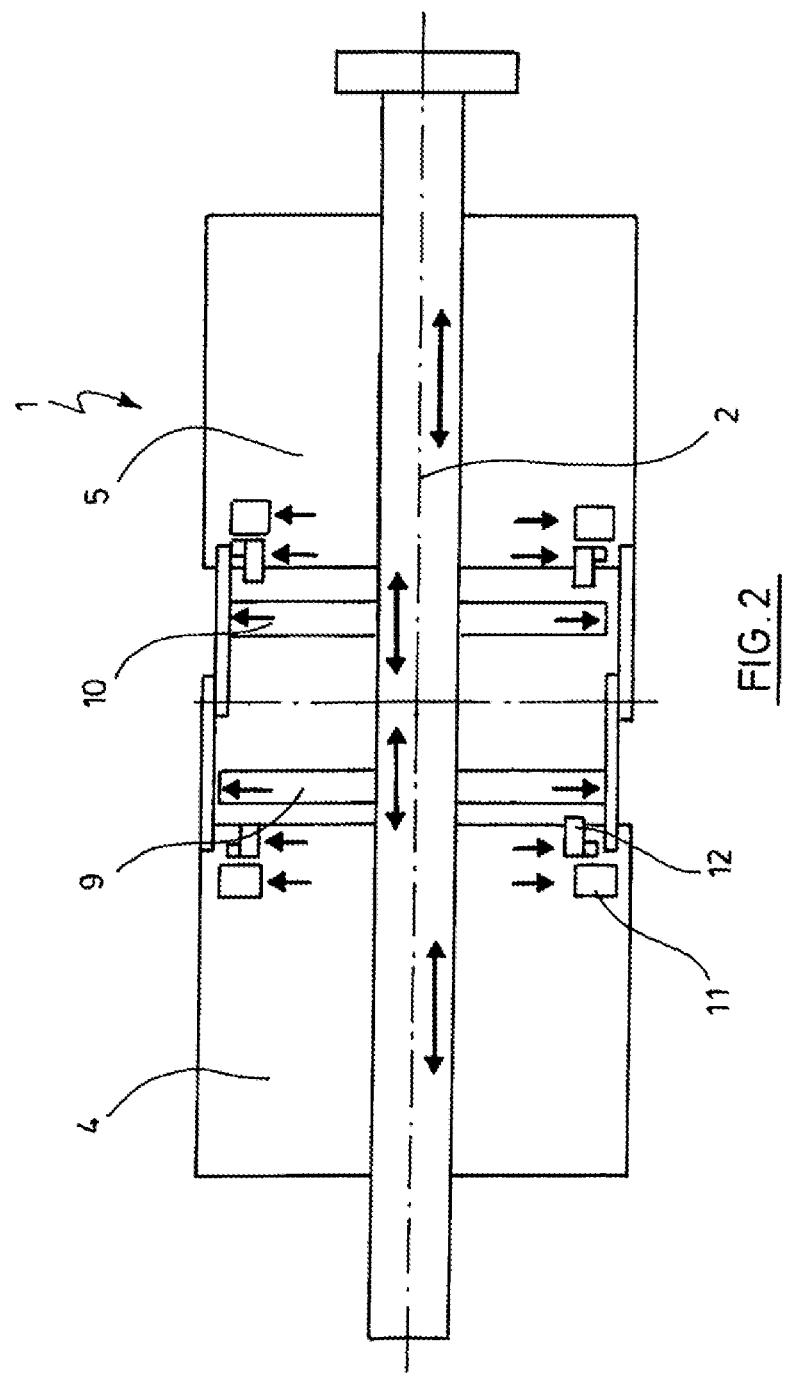
FIG. 2 shows a longitudinal section through the tire building drum as per FIG. 1.

FIG. 2 shows a longitudinal section through the tire building drum (1) as per FIG. 1. It can be seen that the drum halves (4, 5) are arranged so as to be displaceable along the shaft (2). Center devices (9, 10) are arranged between the drum halves (4, 5). It is also possible to see a core clamping means (11) and a core fixing means (12). The method sequence basically corresponds to the process steps discussed below. In a first step, the material is prestressed by virtue of the center device (9, 10) being deployed. Subsequently, the cores are set in place laterally against the center device (9, 10) and are clamped from the inside. In the process, the material is tensioned further. Subsequently, the material is folded over onto the center device (9, 10). In a final process step, the core clamping means (11) is released, and the drum halves (4, 5) are moved outward.

The movement of the drum halves (4, 5) gives rise to a free space between the center device (9, 10) and the drum halves (4, 5). It is then possible for further material to be laid on. The material is then folded over under the core by way of a rolling-on means.

In a subsequent process step, the drum halves (4, 5) move toward the center device (9, 10) and the core fixing means (12) is placed in position under the core. Owing to the process steps of an initial slight expansion, then moving together and subsequent full expansion, the core is fully fixed in interaction with the center device (9, 10). The process is continued to the required extent.

The individual process steps, discussed above in an abbreviated manner, will be discussed in detail below on the basis of the further figures.

Figure 3:
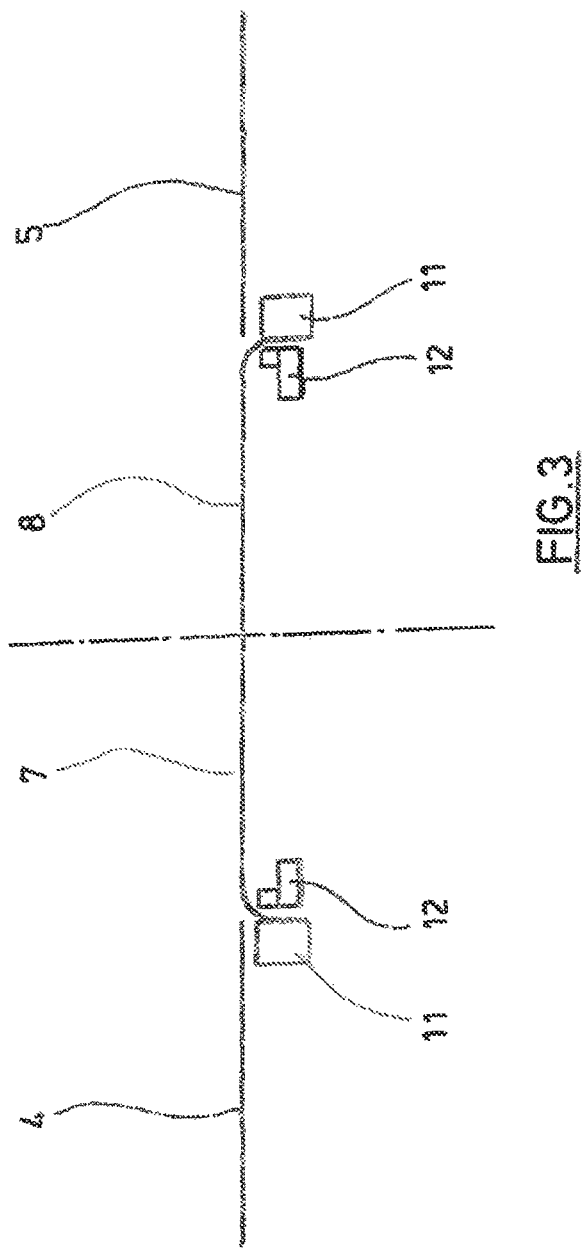
FIG. 3 is a schematic illustration of the drum in a flat state.

FIG. 3 shows the tire building drum (1) in a flat state. It is possible to see the drum halves (4, 5), the central parts (7, 8) and the core clamping means (11) and the core fixing means (12).

Figure 4:
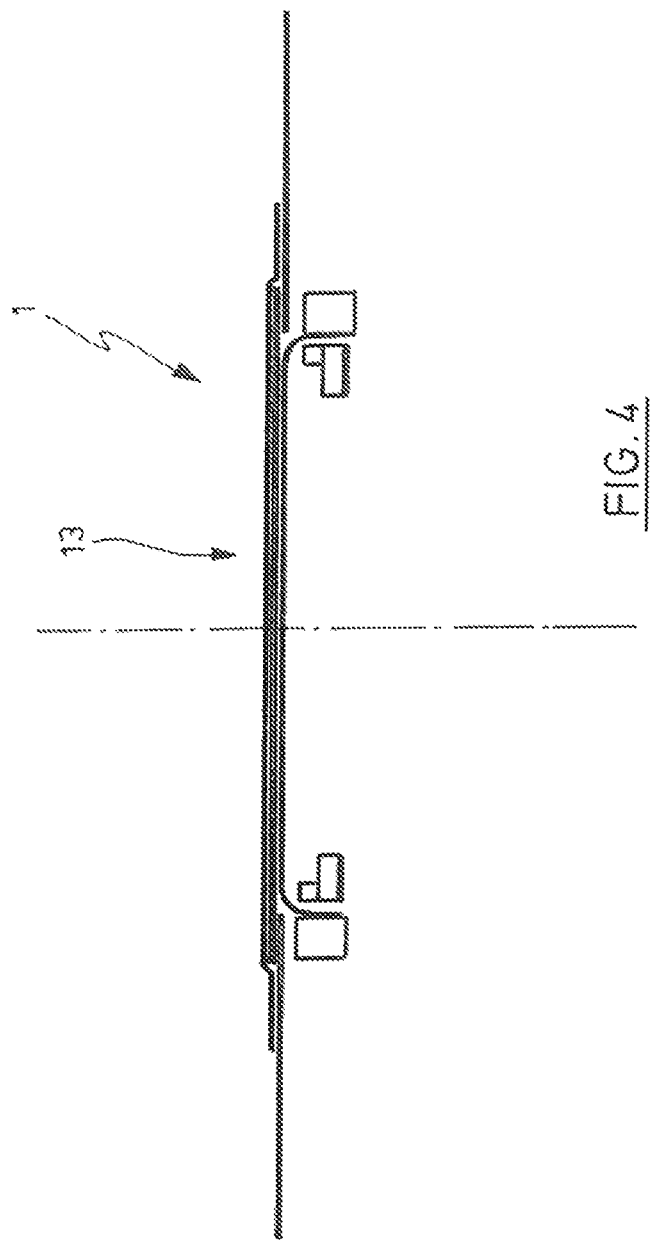
FIG. 4 shows the drum as per FIG. 3 in a flat state with material laid thereon.

In FIG. 4, the tire building drum (1) is again in the flat state. The material (13) has been laid on.

Figure 5:
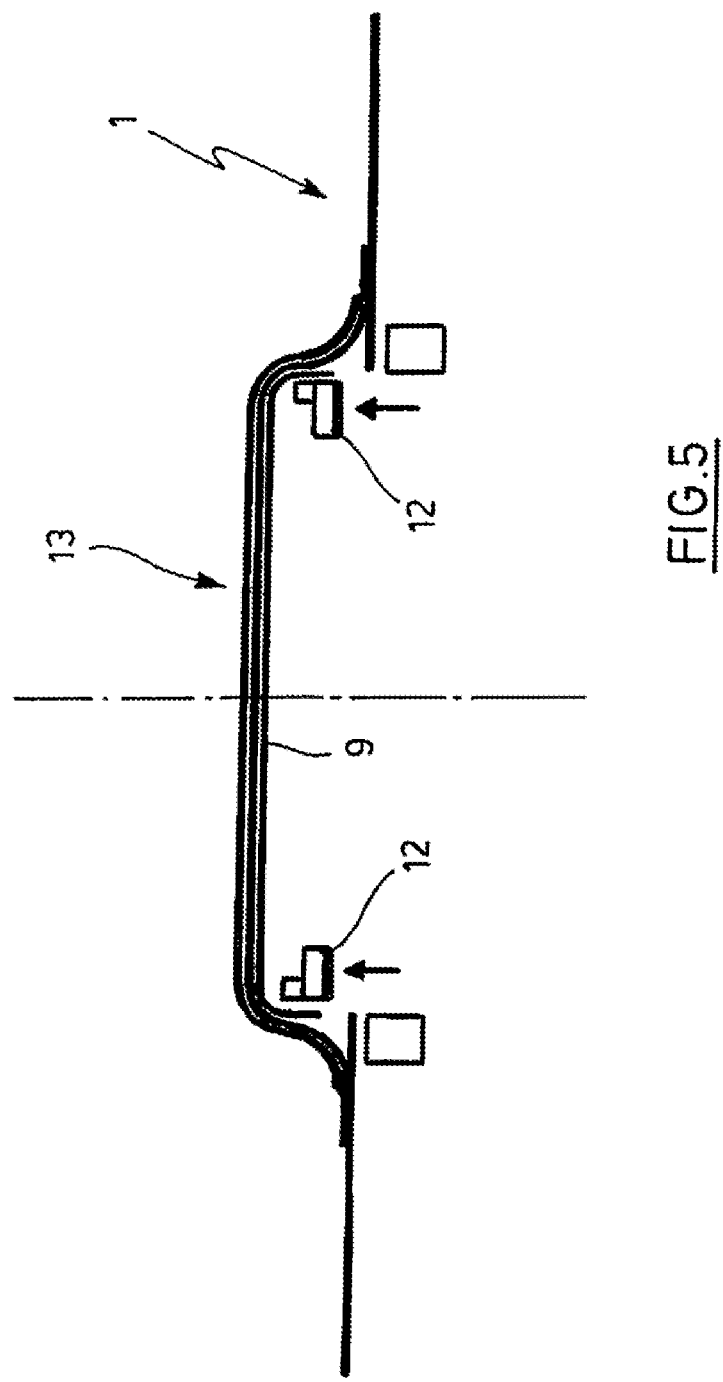
FIG. 5 shows the tire building drum with an expanded core fixing means and an outwardly displaced center device.

In the process step illustrated in FIG. 5, the core fixing means (12) has been expanded and, in this case, lifts the center device (9) outward. The material (13) is hereby tensioned.

Figure 6:
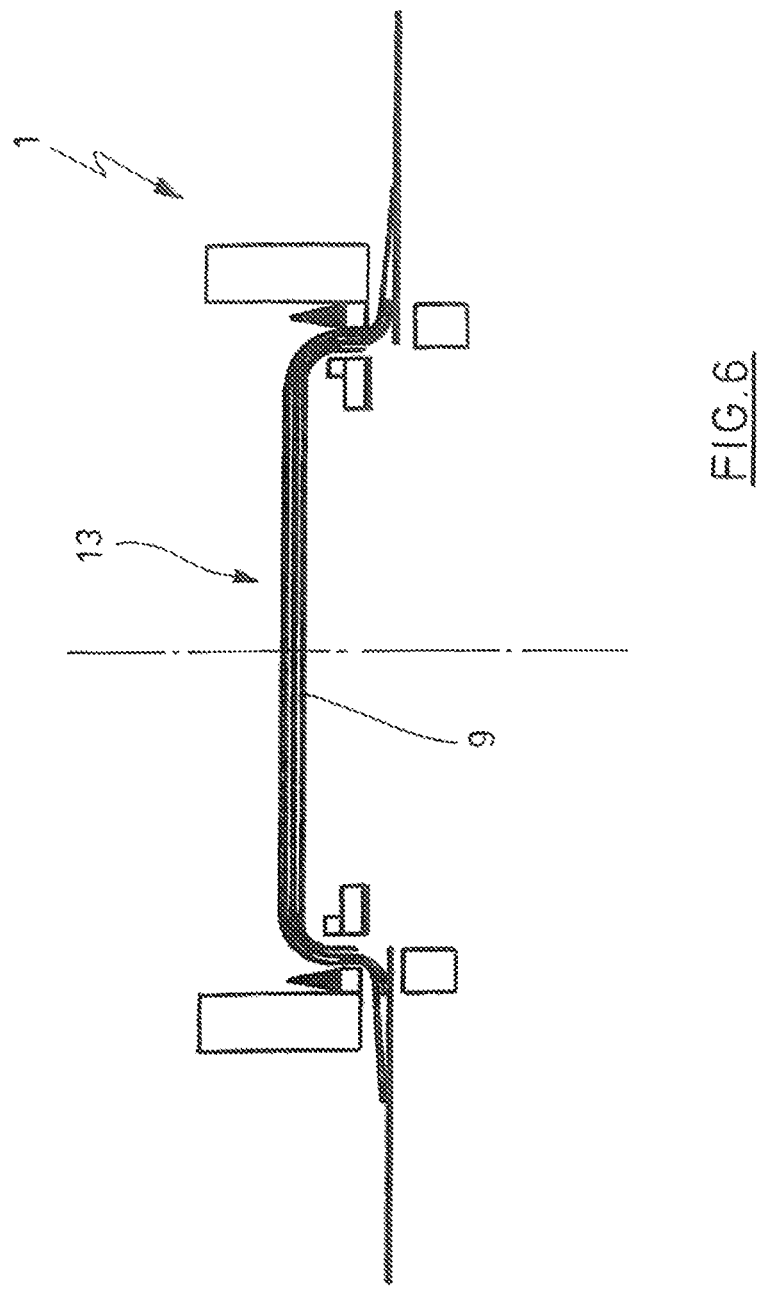
FIG. 6 shows the tire building drum with cores held from the outside and with cores set in place for the purpose of tensioning the material.

In the process steps illustrated in FIG. 6, the cores are defined by means of the device and are held from the outside. The cores are set in place and the material is hereby further tensioned. The core setting spacing, or the spacing from core to core, is exactly predefined by the center device (9), and is thus much more clearly defined than in processes according to the prior art.

Figure 7:
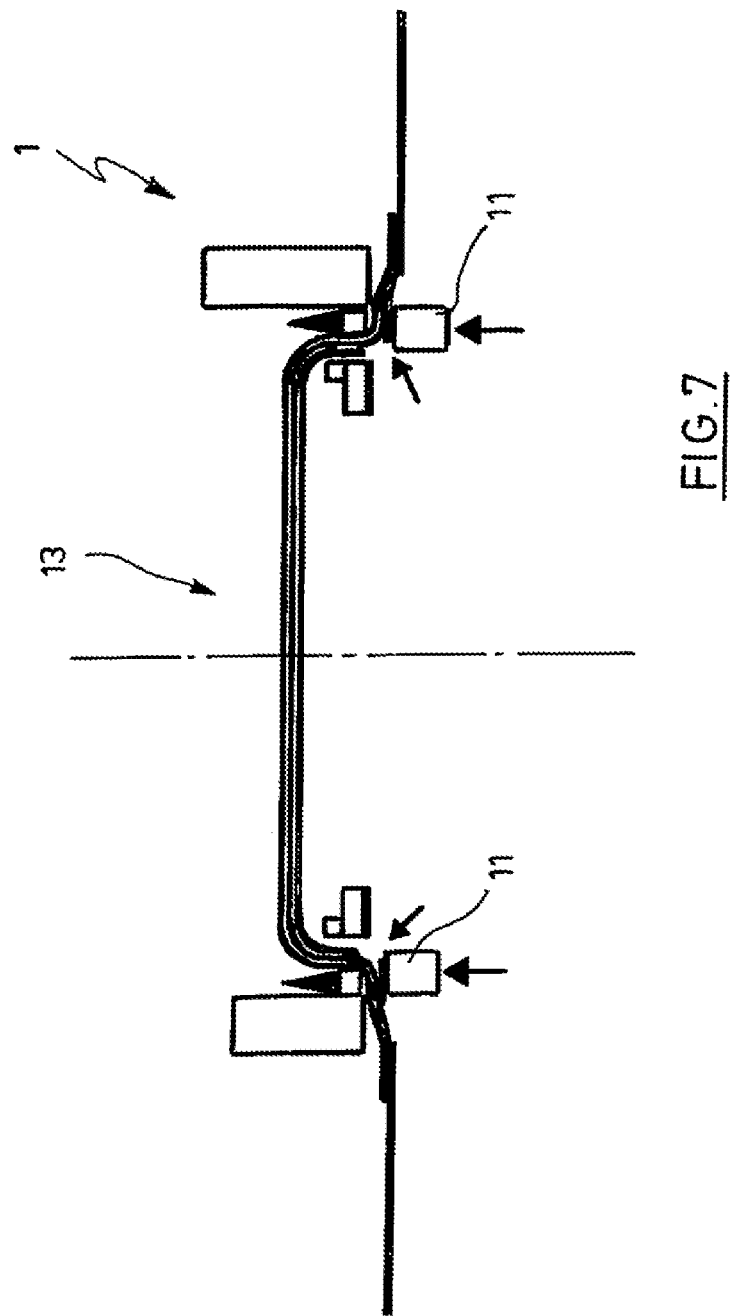
FIG. 7 shows the tire building drum with cores held from the outside and set in place.

In the process step illustrated in FIG. 7, the cores are defined by means of the device and are held from the outside. The cores are set in place and the cores are clamped from below by the expanding core clamping means (11). Here, a front part of a bellows is raised and hereby tensions the material (13) further.

Figure 8:
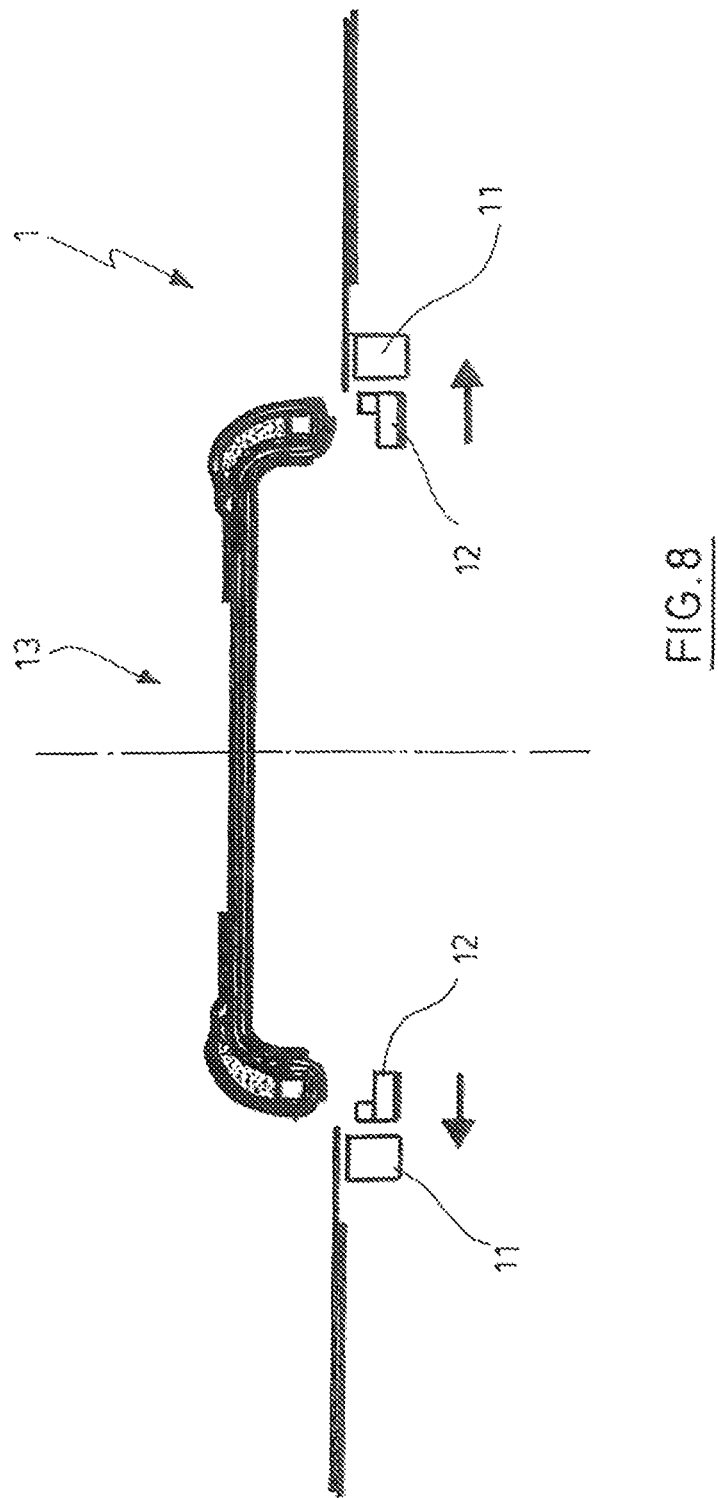
FIG. 8 shows the tire building drum after ply fold-over has been performed, and with cores set in place and held on the central part.

In the process step illustrated in FIG. 8, the ply fold-over has been performed and the cores are set in place and are held in a defined manner on the central part. The interconnection of the material ensures that the material assembly (13) rests firmly on the central part. The core clamping means (11) is retracted, and the core fixing means (12) is likewise retracted. The drum halves (4, 5) can move apart.

Figure 9:
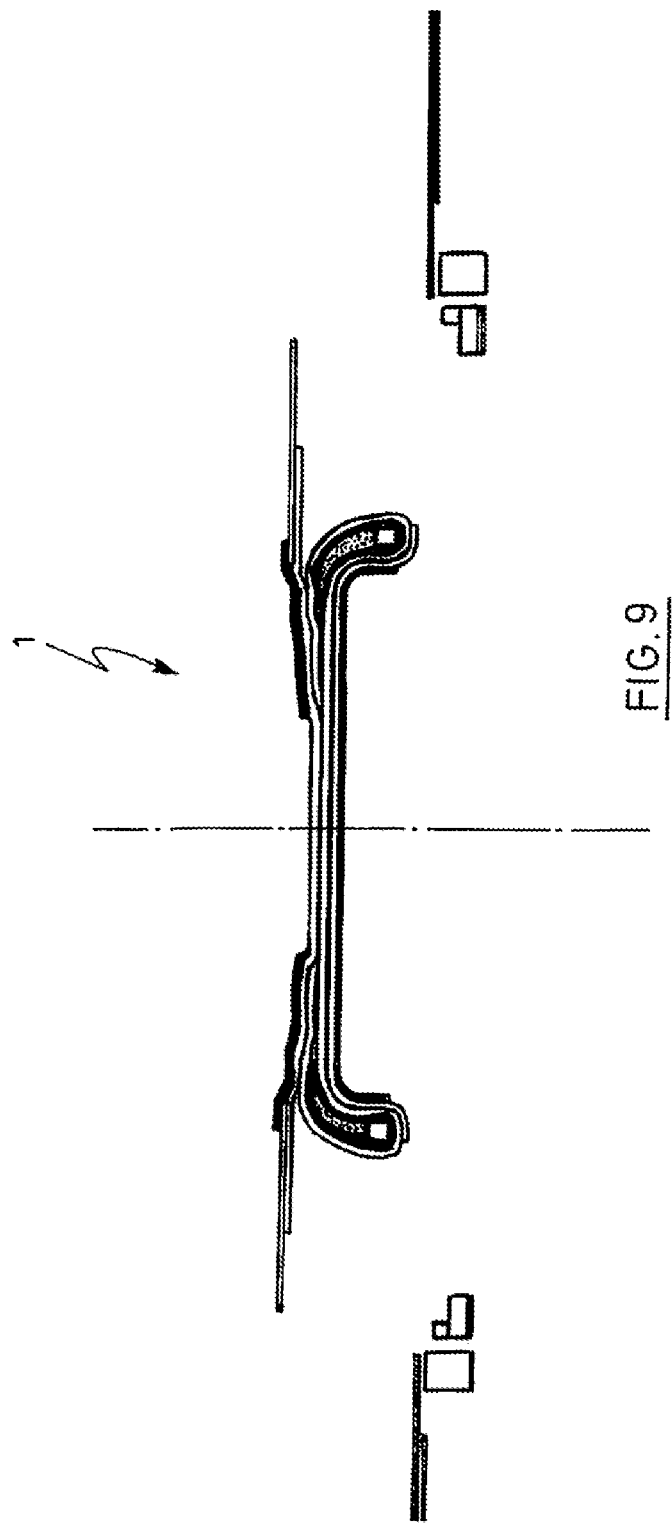
FIG. 9 shows the tire building drum with a material assembly seated firmly on the central part.

In the process step shown in FIG. 9, the cores are set in place and are held in a defined manner on the central part.

The interconnection of the material ensures that the material assembly (13) rests firmly on the central part. The two drum halves (4, 5) have been moved apart. This gives rise to a free space between the drum halves (4, 5) and the center device (9, 10). In a subsequent step, the material is laid on.

Figure 10:
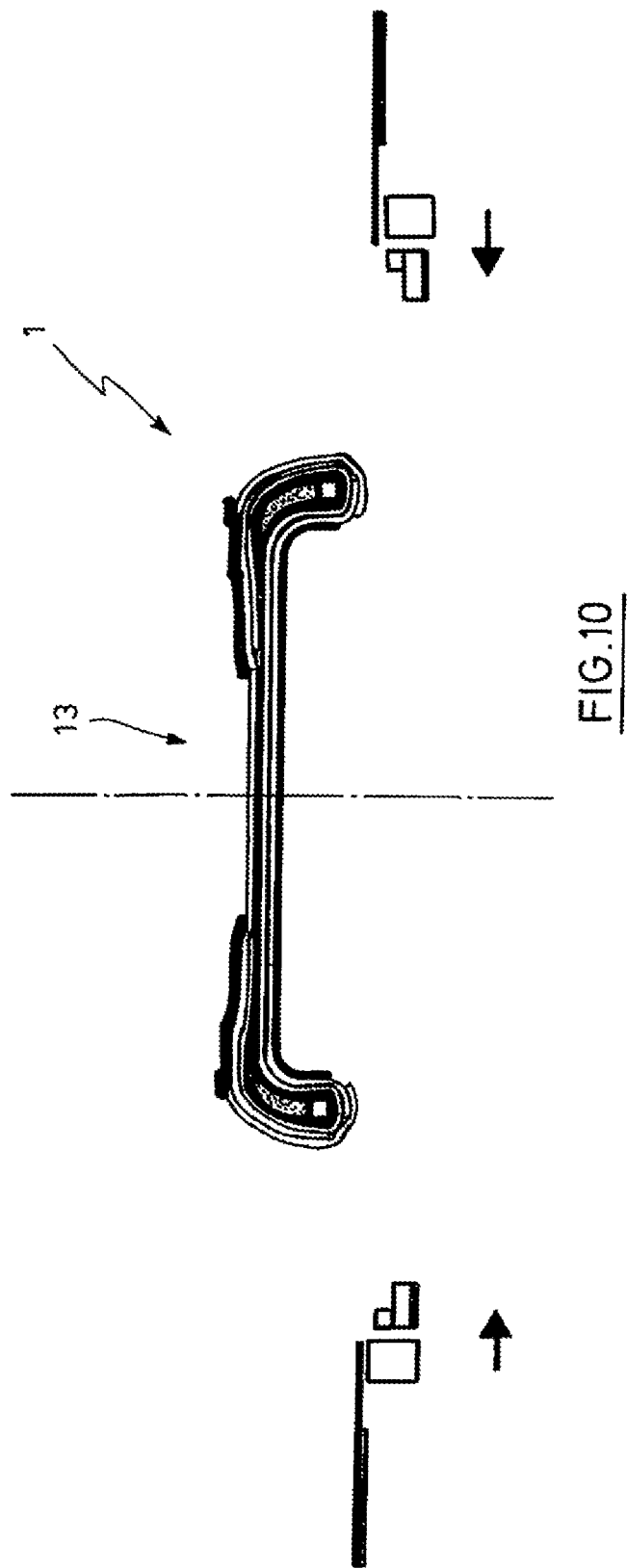
FIG. 10 shows the tire building drum after a fold-over of the material under the core.

In the process step shown in FIG. 10, the material (13) is folded over under the core and the two drum halves (4, 5) move together.

Figure 11:
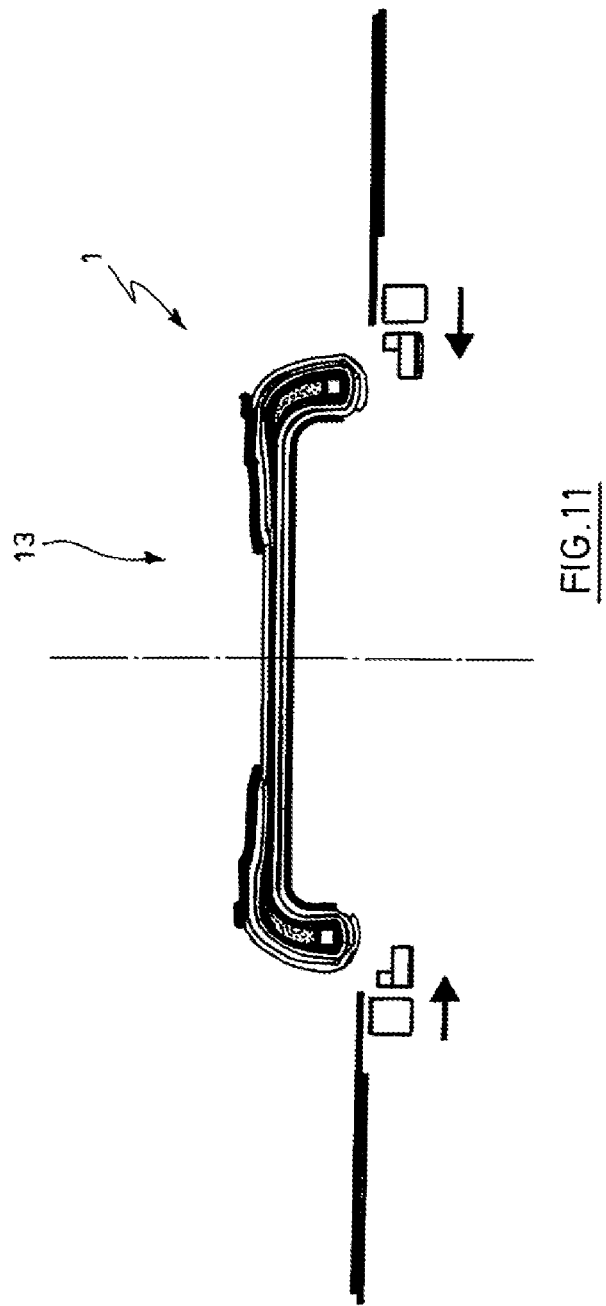
FIG. 11 shows the tire building drum with drum halves having been moved together.

In the process step shown in FIG. 11, the two drum halves (4, 5) are moving together and the core fixing means (12) is in position under the cores.

Figure 12:
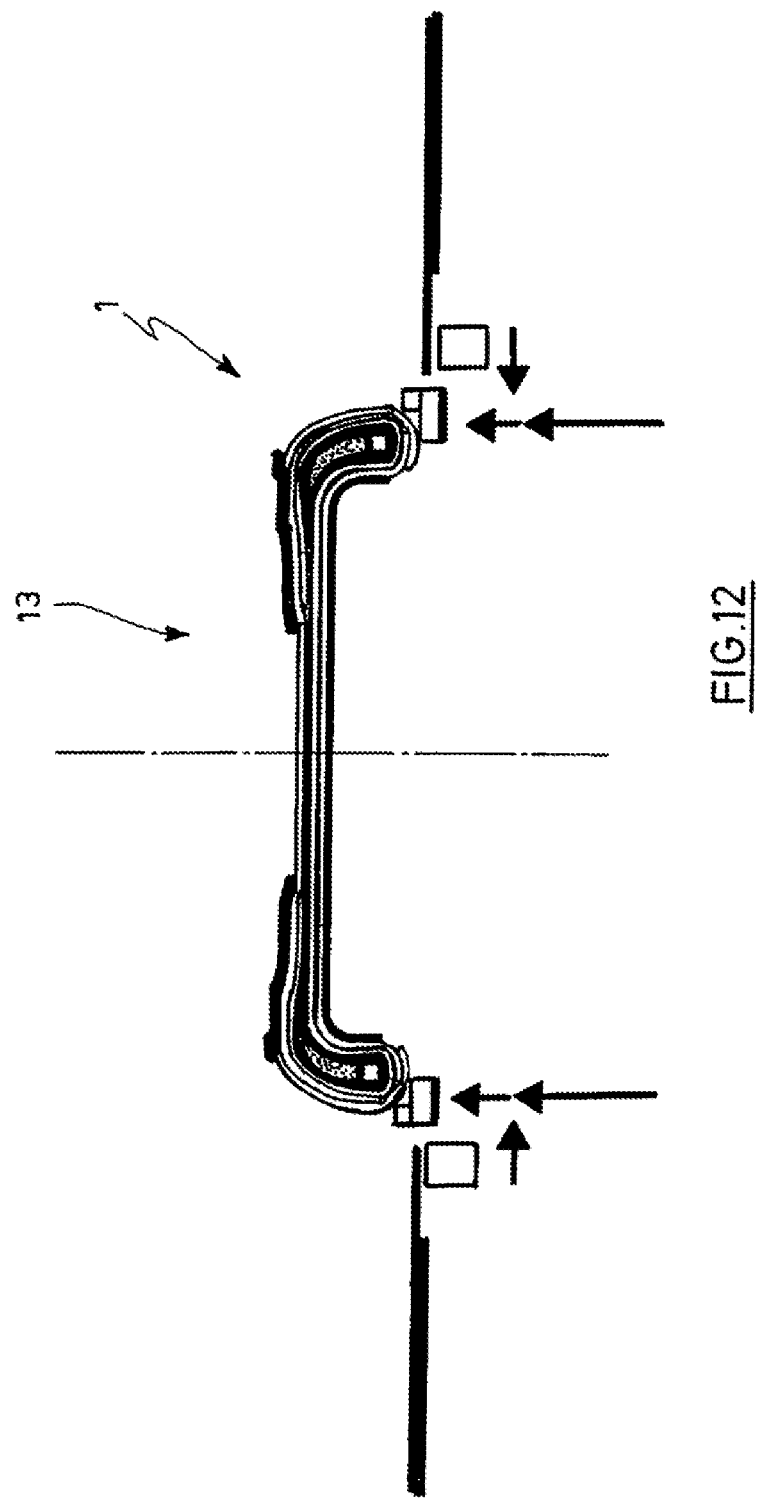
FIG. 12 shows the tire building drum with a core fixing means having been expanded using little pressure.

In the process step shown in FIG. 12, the core fixing means (12) is expanding with little pressure and the drum halves (4, 5) are moving in the direction of the center of the drum in order to fix the core with the outer contact edge of the core fixing means (12). The core fixing means (12) then expands at high pressure in order to fully fix the core.

Figure 13:
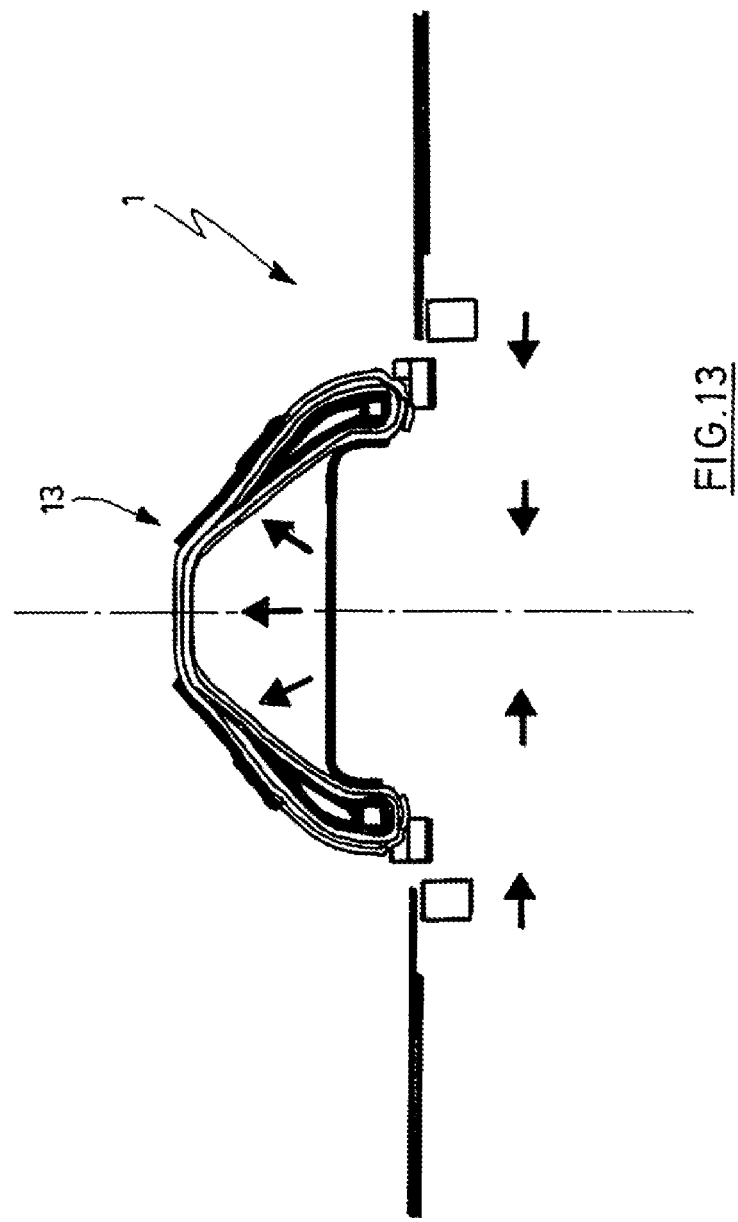
FIG. 13 shows the tire building drum with a fully fixed carcass assembly which is subjected to pressure and is lifted toward the center.

In the process step shown in FIG. 13, the fully fixed carcass assembly is being subjected to pressure and is rising in the center. In parallel with this process, the drum halves (4, 5) and the center device (9, 10) move together. Owing to the fact that the spacing between the cores is defined at each point in time in the process, excellent uniformity of the tires can be achieved. Another contributing factor to this uniformity is that the core is supported during the entire process.

Figure 14:
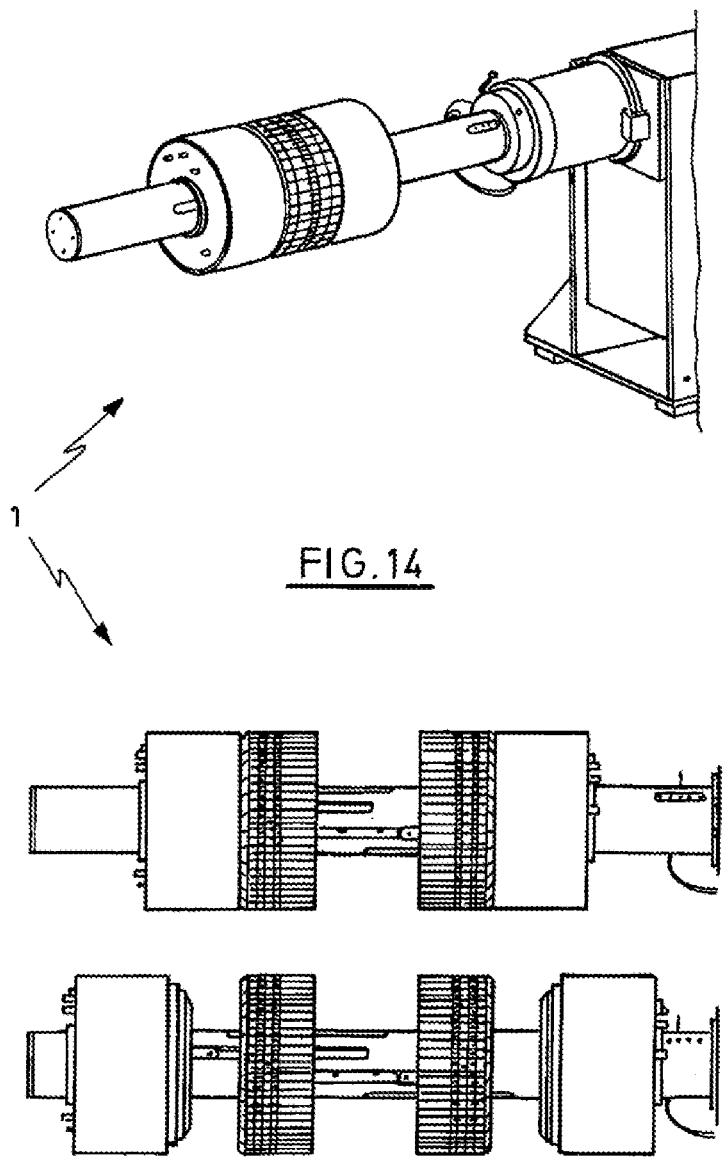
FIG. 14 shows further views of the tire building drum in different positions of the individual parts.

For illustrative purposes, FIG. 14 shows further views of the tire building drum (1) in different positions of the individual parts.

The invention claimed is:

1. A device for producing a green tire, comprising: a tire building drum on which at least two materials in strip form are positioned; core setting means for setting at least two cores of the green tire in place in the device; wherein the tire building drum is equipped both with a core clamping means and with a core fixing means, wherein the tire building drum is formed from a central part and two drum halves arranged adjacent to the central part on both sides, wherein the drum halves are positionable in an axial direction, wherein the central part has a variable diameter in a radial direction perpendicular to the axial direction; and further comprising a center device for stretching materials of the green tire, wherein the drum halves and the center device are positioned so as to be able to form a free space between the center device and the two drum halves, wherein the core fixing means is expandable in the radial direction prior to setting of the cores and lifts the center device in the radial direction whereby the materials of the green tire are tensioned in the radial direction by movement of the center device, wherein the cores after setting are clamped from below by a radial expansion of the core clamping means, and wherein the core fixing means is expanded in a radial direction to fully fix the cores in the axial direction in addition to the radial direction by a combination of the core fixing means and the core setting means before the green tire is subjected to internal pressure and rises from the drum in a center region, and wherein the clamping means and the fixing means are movable in the axial direction by a movement of the drum halves, wherein the drum halves are positioned in the axial direction in a first step and, after the first step, away from the center device in a second step so that there are free spaces between the center device and each of the drum halves, wherein the spaces are configured to permit laying-on further material that is folded over under the core by rolling-on means.

2. The device as claimed in claim 1, wherein the central part is configured so that a radial enlargement of the diameter of the central part is performable before the cores are set in place.

3. The device as claimed in claim 1, wherein the drum halves are positionable independently of one another.

4. The device as claimed in claim 1, wherein the core setting means includes at least one core setting device that is positionable in an axial direction.

5. The device as claimed in claim 1, wherein the core fixing means is expandable by a relatively low pressure or a relatively high pressure.

6. The device as claimed in claim 1, wherein the core clamping means and the core fixing means are positionable independently of one another.

7. The device as claimed in claim 1, wherein the core fixing means includes a radially outwardly directed external shoulder.

8. The device as claimed in claim 1, wherein the center device is positionable in an expanded position without the drum halves.

* * * * *